June 2, 1942.  H. S. JONES  2,285,118
IMPEDANCE MEASURING APPARATUS
Filed Aug. 31, 1938  2 Sheets-Sheet 1
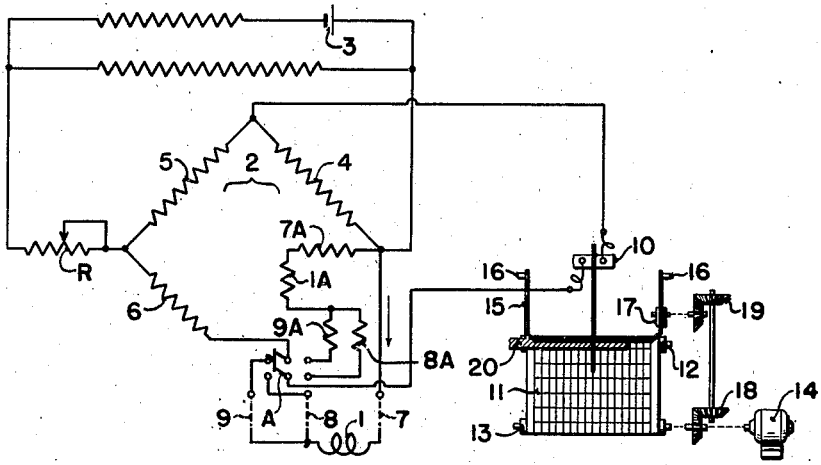
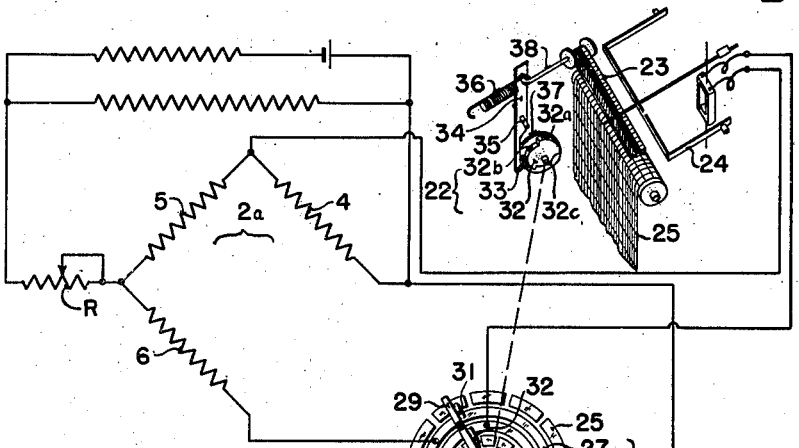
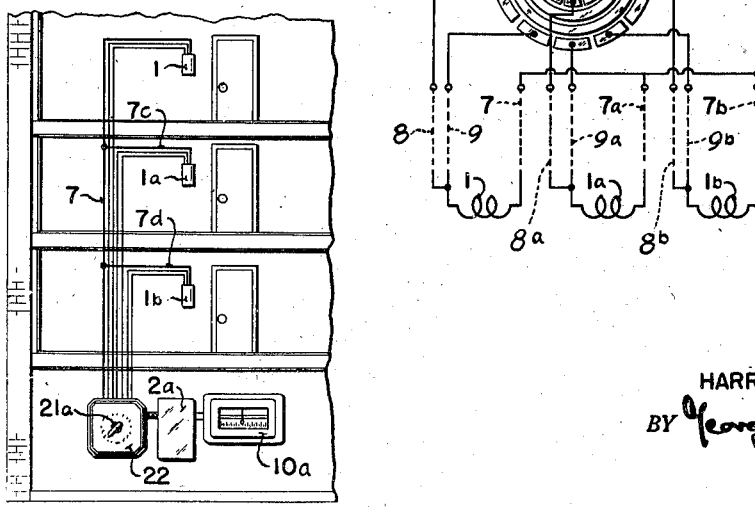
INVENTOR.
HARRY S. JONES
BY George W Munchaus
ATTORNEY.

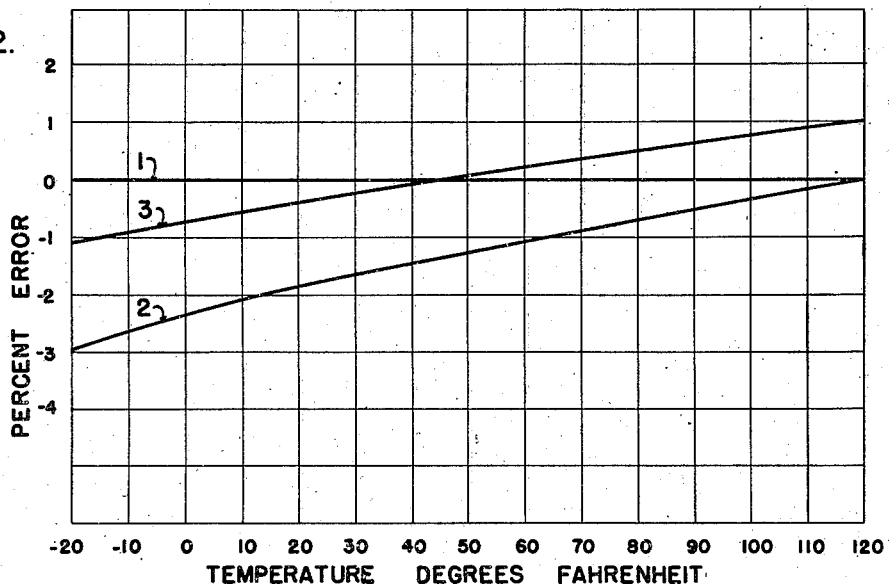
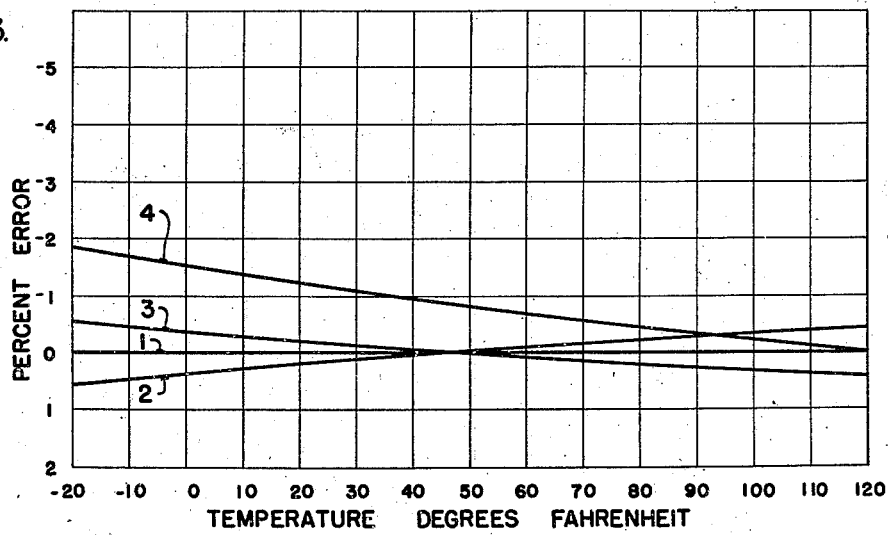
INVENTOR.
HARRY S. JONES
BY
ATTORNEY.

Patented June 2, 1942

2,285,118

UNITED STATES PATENT OFFICE 2,285,118

IMPEDANCE MEASURING APPARATUS

Harry S. Jones, Philadelphia, Pa., assignor to The Brown Instrument Company, Philadelphia, Pa., a corporation of Pennsylvania Application August 31, 1938, Serial No. 227,681

14 Claims. (Cl. 73—342)

The present invention relates to measuring systems which employ a condition responsive device disposed at a point remote from the indicating apparatus.

In one specific embodiment my invention relates to improvements in electrical measuring systems of the resistance thermometer type in which the resistance and thereby the temperatures indicated by a resistance thermometer is measured by means of a Wheatstone bridge network.

In the resistance thermometer systems known heretofore, sufficiently accurate readings have been obtained when the variations of temperature to which the resistance thermometer is subjected are small, but when the temperature variations are greater the accuracy of the instrument is impaired due to errors introduced within the instrument itself. Such errors occur as a result of potential drops produced across the conducting leads which connect the resistance thermometer to the Wheatstone bridge. The errors, in addition, vary in magnitude in accordance with the variations in temperature being measured since the current flows through the conducting leads referred to change in value as the Wheatstone bridge network is unbalanced.

When the bridge network is in a state of balance, for example, no current flows through the indicating device, usually a millivoltmeter connected across the normally equipotential terminals of the network, and, therefore, all of the current that passes through a conducting lead in one arm thereof passes through a conducting lead in an adjacent and opposed arm. The voltage drops across the conducting leads will then have a predetermined relationship and the error will be negligible, but when the bridge network is unbalanced as a result of a change in resistance of the resistance thermometer, this relationship is disturbed and error is introduced since some of the current that passes through one of the conducting leads is shunted around the second conducting lead and is passed through the millivoltmeter. This shunted current actuates the millivoltmeter to produce a deflection of the latter, but it will be noted the deflection will not be caused solely by the change in resistance of the resistance thermometer, but will include a component produced as a result of the change in relationship of the potential drops across the conducting leads referred to. As will become apparent, the magnitude of the error will vary in accordance with the magnitude of the current passed through the millivoltmeter, and hence in accordance with the extent of departure of the resistance of the resistance thermometer from a predetermined value. In other words, the magnitude of the error introduced will be dependent upon the width of the range of temperature variation, and accordingly will be small when the limits of variation are close together but will become appreciable when the limits of variation are wider apart.

In one prior art device means have been provided to compensate for such errors by employing a fixed resistance which may be connected into and out of the bridge network manually, and which resistance is of the proper value to balance the bridge when the condition responsive device is exposed to the precise value of the condition it is desired to maintain. In practical applications, however, such means are not sufficient since the distance between the condition responsive device and the bridge network varies with different installations and the electrical conducting leads connecting the condition responsive device to the bridge network comprise resistances therein. Because of the resistance of the electrical conducting leads referred to it would be necessary in the prior art device mentioned to provide a resistance of different value for every installation in which the condition responsive device is at a distance from the bridge network different from a predetermined distance.

Accordingly, an object of my invention is to provide a system of the above referred to type, in which the variations in the distance between the condition responsive device and the remainder of the system do not introduce any error into the measurement when the condition is at a predetermined value.

Another object of my invention is to provide a system of the above referred to type in which the distance between the condition responsive device and the remainder of the system may be varied without introducing apreciable error into the reading at any point throughout the range of measurement.

A further object of my invention is to provide a system of the above referred to type wherein the error is minimized without requiring the use of auxiliary devices.

A still further object of my invention is to provide a system of the above referred to type which may be so calibrated that, when the distance between the condition responsive device and the remainder of the system is a predetermined value, measurements which are free from error may be made throughout the range of measurement.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings:

Fig. 1 is a diagrammatic illustration of the invention employed in a temperature measuring application;

Figs. 2 and 3 are graphs comparing the magnitude of the error obtained with the system of Fig. 1 with the magnitude of the error obtained with systems of the kind known heretofore; and Figs. 4 and 5 illustrate modifications of the arrangement of Fig. 1 in which the temperature at a plurality of points is adapted to be measured.

In Fig. 1, I have illustrated, more or less diagrammatically, the use of my invention in a temperature measuring system in which a device 1, disposed at a point whose temperature it is desired to measure and adapted to vary in resistance in accordance with the temperature variations to which it is exposed, is included in one arm of a Wheatstone bridge network 2 to which energizing current is supplied from a battery 3. The other arms of the bridge network include fixed resistances 4, 5 and 6 suitably proportioned to the resistance of the device 1 when the latter is at a predetermined temperature. The device 1, in practice, is normally disposed at a point remote from the remaining bridge network arms, and as illustrated, is connected into the bridge network by conducting leads 7, 8 and 9, shown in dotted lines to indicate that they may be of any desired length. One terminal of a galvanometer 10 is connected to the end of conductor 8 remote from the device 1, and the other terminal thereof is connected to the point of engagement of the bridge network arms 4 and 5.

As is well known, the current conducted by the galvanometer, other conditions remaining constant, is a function of the resistance of the device 1. By associating the galvanometer with a suitably calibrated scale, the galvanometer may therefore be employed to directly indicate the variations in resistance of the device 1 and thereby the variations in the temperature to which the device 1 is subjected. As noted hereinbefore, this method of obtaining a measure of the temperature to which the device 1 is subjected is sufficiently exact when the range of temperature variations is narrow, and hence a very small current flows through the galvanometer. When the temperature variations are large, however, a greater current is conducted by the galvanometer, and as a result, the instrument accuracy is reduced.

The reduction in instrument accuracy when a larger current is conducted by galvanometer 10 is due to a difference in the voltage drops produced across conductors 7 and 9 as a result of the increased current flow through the galvanometer. That is to say, when the current flow through conductor 7 is in the direction of the arrow, more current flows through conductor 7 than through conductor 9 since part of the current that flows through conductor 7, and which would otherwise also flow through conductor 9, is shunted through conductor 8 and galvanometer 10 when the bridge network is unbalanced. Thus with current flowing through conductor 7 in the direction indicated by the arrow, if the conductors 7 and 9 are of equal resistance, a greater potential drop will be produced across conductor 7 than across conductor 9. The difference in voltage drops across conductors 7 and 9 operate to cause a current flow through galvanometer 10 in addition to the current flow therethrough caused by the change in resistance of device 1, and thereby deflection of the galvanometer pointer different from that which would be caused by the change in resistance of the device 1 alone. The indication of galvanometer 10, thus, will be in error.

I have discovered that such error may be minimized by making the resistance of conductor 7 somewhat less than the resistance of conductors 8 and 9, the latter of which may be of the same magnitude, the extent to which the resistance of conductor 7 is less being determined by the temperature at which it is desired the error shall be zero in value. By way of illustration, it is noted that when the bridge network resistances 4, 5 and 6 have values of 80 ohms, 80 ohms, and 629 ohms, respectively, and the device 1 is adapted to vary in resistance from 441.2 ohms at $-20°$ F. to 629 ohms at 120° F., the conductors 7, 8 and 9 may be comprised of Nos. 16, 18 and 18 copper wire, B. and S. gauge, respectively.

In Fig. 2 I have illustrated by means of a graph the extent to which the error is reduced when the conductors 7, 8 and 9 are so proportioned as distinguished from the error obtained when said conductors are all of the same wire size. The error obtained when the conducting leads are zero in length is shown by curve 1 and, as illustrated, is zero throughout the range of measurement. The error obtained when the conducting leads are 1000 feet in length and are all the same size is shown by curve 2 and has been shown as zero at the full scale reading. The error obtained with conducting leads 1000 feet long and proportioned as noted above is illustrated by curve 3. It will be noted the error obtained with the latter arrangement has been reduced to zero at a point near the center of the scale where most of the indications will be had. The error at the ends of the scale, in addition, is much less than that at the lower end of the scale for curve 2.

It is noted that when the conducting leads 7, 8, and 9 are proportioned as noted above, the error may be rendered zero throughout the range of measurement for any desired length of the conducting leads by properly calibrating the bridge network 2. This feature is important since the network 2 may then be so calibrated that the error will be zero when conducting leads of a length which is an average of the lengths most frequently used in commercial applications are employed. As illustrated in Fig. 1 means have been provided for calibrating the bridge network 2 including a switch A and calibrating resistances 1A, 7A, 8A and 9A. The calibrating resistances are adapted to be connected into the bridge network 2 by switch A in lieu of the conductors 7, 8 and 9 and are desirably so proportioned as to create network conditions when calibrating which are identical with those existing when measuring the resistance of the device 1. An adjustable rheostat R in circuit with the bridge network energizing terminals is provided for calibrating purposes for adjusting the current flow through the network. In calibrating the instrument the rheostat R is adjusted until the deflection of the pointer of galvanometer 10 is of a predetermined value corresponding to the resistance of element 1A and thereby to a particular value of the device 1. For example, resistance 1A may be made equal to the resistance of the device 1 when the latter is exposed to the lowest temperature it is adapted to measure and resistances 7A, 8A and 9A may be made equal to the resistances of conducting leads 7, 8, and 9, respectively, when the latter are of a length which is an average of the lengths most frequently employed. In applications with which I am familiar the average length seems to be about 500 feet and, thus, I prefer to employ resistances 7A, 8A, and 9A which are equal to the resistances of resistances 7, 8, and 9, respectively, when the latter are 500 feet in length.

In Fig. 3 I have illustrated by means of a graph the error obtained when the network is so calibrated. As shown by curve 1, the error is zero throughout the range of measurement when conducting leads 500 feet long are employed. The errors obtained when leads of zero length and 1000 feet are employed are illustrated by curves 2 and 3, respectively, the instrument calibration remaining the same. For purposes of comparison the error obtained when the conducting leads are all of the same wire size, for example, No. 16, B. and S. gauge and 1000 feet long has been illustrated and is shown in curve 4. It will be noted the error obtained by the latter arrangement is appreciably greater than that obtained throughout the range from 0 to 1000 feet when the arrangement of my invention is employed.

It will be apparent the deflections of the pointer of galvanometer 10 may be recorded, if desired, and in Fig. 1 I have shown the said pointer disposed in cooperative relation with a recorder chart 11 which is unwound from a roll 12 onto a roll 13, the latter of which is driven at a constant speed by a unidirectional motor 14. The galvanometer pointer is periodically lowered and raised under the control of a depressor bar 15 which is pivotally supported above the pointer at the points 16 in any suitable manner and is actuated by a suitably configured cam 17 on which the depressor bar rests, and which is rotated by any suitable means, for example, by motor 14 through gearing 18 and 19, as shown. A suitable typewriter ribbon 20 is disposed between the galvanometer pointer and the chart 11, preferably directly above the roller 12, so that when the depressor bar moves the pointer downward, the latter will press the ribbon against the chart to make a mark on the chart. Such a mark will be made on each downward movement of the depressor bar to thereby provide a record of the various positions assumed by the pointer.

In Fig. 4 I have illustrated the use of my invention in recording the temperatures at a plurality of points by means of a single bridge network 2a and an associated recording device to be described. As illustrated, a temperature responsive device 1, 1a, and 1b is provided at each point it is desired to measure the temperature and to effect cooperation of each individual temperature responsive device with the common recording device, a rotary switch 21 and a cam operated mechanism 22 are provided for successively connecting a device 1, 1a, and 1b into the bridge network 2a, and for simultaneously moving a different colored section of a multicolored marker ribbon 23 under the pointer of galvanometer 10. Successive movements of a cooperating depressor bar 24 in a downward direction into engagement with the galvanometer pointer will then result in a mark being made on a record chart 25, which mark is of a color corresponding to the temperature responsive device then connected into the bridge network.

The rotary switch 21 referred to includes two rows of a plurality of arcuate segments 25 and 26 in each row respectively, and which are insulated from each other, two conducting rings 27 and 28 each of which are insulated from the arcuate segments, and a distributor arm 29 mounted on a shaft 30. The distributor arm 29 is provided with a brush 31 insulated therefrom and adapted to connect the arcuate segments 25 in succession with the conducting ring 27 and a brush 32 insulated therefrom and adapted to connect the arcuate segments 26 in succession with the conducting ring 28. The shaft 30 is rotated in a counterclockwise direction in a suitable manner at uniform speed and connects each device 1, 1a and 1b successively with the bridge network 2a.

The cam operated mechanism 22 referred to for moving a different colored section of the multi-colored ribbon 23 under the galvanometer pointer includes a cam 32 which is mounted for rotation on the shaft 30 and is integral therewith. The cam 32 is so configured as to provide edge segments 32a, 32b, and 32c which are adapted to cooperate with a roller 33 on one end of an arm 34 which is pivoted for rotation on a shaft 35. Arm 34 is biased for rotation in a counterclockwise direction by spring means 36, so that the roller 33 on the end of arm 34 is held into engagement with the edge of cam 32. A disc 37 mounted for rotation on the shaft 30 and integral with cam 32 is provided for guiding the roller 33 in order to prevent the latter from sliding off the edge of the cam. Two similar discs 37 mounted on opposite sides of the cam may desirably be employed for this purpose.

The other end of arm 34 is connected to a ribbon guide roll link 38 so that when the cam 32 rotates, the roller 33 will engage and then leave the province of edge segments 32a, 32b, and 32c in succession to impart a series of movements to the link 38 to thereby move the various sections of the multi-colored ribbon 23 under the galvanometer pointer in succession. Thus, as the distributor arm 29 of the rotary switch 21 moves from one set of arcuate segments to the next, the next succeeding device 1, 1a or 1b will be connected into the bridge network 2a and simultaneously the corresponding colored section of ribbon 23 will be moved under the galvanometer pointer, so that a record of the temperatures to which each of the devices 1, 1a and 1b are exposed will be recorded by a series of different colored marks on the chart 25.

As illustrated, conducting leads 7, 8 and 9 connect the device 1 to the rotary switch 21, and similarly conducting leads 7a, 8a and 9a, and 7b, 8b and 9b connect the devices 1a and 1b, respectively, thereto. It is noted the lengths of leads 7, 8 and 9 may be different from that of leads 7a, 8a, and 9a or 7b, 8b and 9b, and yet the error curves for each measurement will not be substantially different.

In Fig. 5 I have illustrated a modification of the arrangement of Fig. 3 in which the switch 21 is manually operated by means of a knob 21a and an indication only of the temperatures to which the various devices 1, 1a and 1b are subjected is had. The said devices are shown by way of illustration as positioned on different floors of a building, and the switch 21, bridge network 2a, and indicating galvanometer 10a are shown on the same floor. As illustrated, the leads 7a and 7b of the Fig. 4 arrangement may desirably be dispensed with and a common lead 7 provided to all of the bulbs, leads 7c and 7d being provided for connecting the bulbs 1a and 1b to the common lead 7. It is noted a calibrating switch A and suitable calibrating resistances may be employed for calibrating the network 2a of Figs. 4 and 5 as in the arrangement of Fig. 1 but such a calibrating arrangement has not been shown in connection with the figures in order not to confuse the drawing.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Measuring apparatus including a normally unbalanced electrical bridge network having a variable impedance to be measured in one arm, said impedance disposed at a distance from said network, means to energize said bridge network, a device connected in said network to indicate the extent of unbalance of the latter, and three electrical conducting leads at least two of which are of different resistance per unit length connecting said impedance to said network, said conducting leads being so connected to said network that all of the current to said impedance flows through said conducting lead of lower resistance per unit length whereby compensation is had for errors in the indication of said device due to the flow of bridge unbalanced currents to the latter.

2. Measuring apparatus including a normally unbalanced electrical bridge network having a variable impedance to be measured in one arm, said impedance disposed at a distance from said network, means to energize said bridge network, a galvanometer having a connection with said network to indicate the extent of unbalance of the latter, three electrical conducting leads at least two of which are of the same material but of different wire size connecting said impedance to said network, said conducting leads being so connected to said network that all of the current to said impedance flows through the larger of said two conducting leads whereby compensation is had for errors in the indication of said galvanometer due to the flow of bridge unbalanced currents to the latter, and a third conducting lead through which only bridge unbalanced currents flow extending between said impedance and said galvanometer.

3. Measuring apparatus including a normally unbalanced electrical bridge network having a variable impedance to be measured in one arm, said impedance being disposed at a distance from said network, means to energize said bridge network, a galvanometer having one terminal connected to said network, and disposed closely adjacent thereto, to indicate the extent of unbalance of said network, a conducting lead connecting one terminal of said impedance to the other terminal of said galvanometer, a second conducting lead connecting said one terminal of said impedance to another arm of said network, and a third conducting lead of different resistance per unit length than said second conducting lead connecting the other terminal of said impedance to said one arm of said network, the relative resistance per unit length of said conducting leads being so proportioned that compensation is obtained for errors in the galvanometer indication due to the difference in current flow through said second and third conducting leads resulting from current flowing in said first conducting lead.

4. Measuring apparatus including a normally unbalanced Wheatstone bridge network having a variable impedance in one arm, said impedance disposed at a distance from said network, means to detect unbalanced E. M. F.'s in said network, an electrical conducting lead through which only the bridge network unbalanced currents flow connecting said impedance to said means, and a pair of electrical conducting leads connecting said impedance to said bridge network, said pair of conducting leads each having a different impedance per unit length and being so connected to said network that all of the current through said impedance flows through the conducting lead of lower impedance whereby compensation is had for the impedance of said conducting leads irrespective of the length of said conducting leads.

5. In apparatus for electrically measuring temperatures, the combination with a normally unbalanced Wheatstone bridge network, of a resistance thermometer included in one arm of said bridge network and disposed at a distance from said network, means to detect unbalanced E. M. F.'s in said network, and three electrical conducting leads connecting said resistance thermometer and said network, at least two of said conducting leads being of different resistance per unit length and all of said conducting leads being so connected to said network that all of the current through said resistance thermometer flows through the conducting lead of lower resistance whereby compensation is had for the resistance of said conducting leads irrespective of the length of said conducting leads.

6. In apparatus for electrically measuring temperatures, the combination with a normally unbalanced Wheatstone bridge network, of a resistance thermometer included in one arm of said bridge network and disposed at a distance from said network, a galvanometer responsive to unbalanced E. M. F.'s in said network and disposed closely adjacent said network and having one terminal connected thereto, a conducting lead connecting said resistance thermometer to the other terminal of said galvanometer, and a pair of conducting leads connecting said resistance thermometer to said network, said pair of conducting leads each being of different resistance per unit length and so connected to said network that all of the current through said resistance thermometer flows through the conducting lead of lower resistance whereby compensation is had for the resistance of said conducting leads irrespective of the length of said conducting leads.

7. In apparatus for electrically measuring temperatures, the combination with a normally unbalanced Wheatstone bridge network, of a resistance thermometer included in one arm of said bridge network and disposed at a distance from said network, a galvanometer responsive to unbalanced E. M. F.'s in said network and disposed closely adjacent said network and having one terminal connected thereto, a conducting lead connecting said resistance thermometer to the other terminal of said galvanometer, and a pair of conducting leads connecting said resistance thermometer to said network, said pair of conducting leads being each of the same material but of different wire size and so connected to said network that all of the current through said resistance thermometer flows through the larger of said conducting leads and being so proportioned that compensation is had for the resistance of said conducting leads irrespective of the length of said conducting leads.

8. Measuring apparatus including a normally unbalanced electrical bridge network, a galvanometer responsive to unbalanced E. M. F.'s in said network and having one terminal connected thereto, a plurality of resistances disposed at different distances from said network, two conducting leads of different wire size associated with each of said resistances and extending between opposite terminals and said network, a third connecting lead associated with each of said resistances and adapted to connect one terminal thereof to the other terminal of said galvanometer, said pair of conducting leads being of different resistance per unit length and so connected to said network that all of the current through each of said resistances flows through said conducting lead of lower resistance and being so proportioned that exact compensation is had for the resistance of said conducting leads for that resistance which is disposed at the average distance of said resistances from said network and partial compensation depending on the distance from said one resistance is had for the remaining resistances.

9. Measuring apparatus including a normally unbalanced electrical bridge network, means to supply electric current to said network, a device to indicate the state of balance of said network, a plurality of resistances disposed at different distances from said network, three conducting leads of the same material extending between each of said resistances and said network and at least two of which are of different wire size, and switching means connected to said conducting leads to successively connect each of said resistances into said bridge network, said conducting leads being so connected to said network that all of the current to each of said resistances flows through the larger conducting lead whereby compensation is had for the resistance of said conducting leads irrespective of the distances of said resistances from said network.

10. Measuring apparatus including a normally unbalanced electrical bridge network, means to supply electric current to said network, a device to indicate the state of balance of said network, a plurality of conducting elements disposed at different distances from said network, three conducting leads extending between each of said conducting elements and said network and at least two of which are of different resistance per unit length, and switching means connected to said conducting leads to successively connect each of said conducting elements into said bridge network, said conducting leads being so connected to said network that all of the current to each of said conducting elements flows through the conducting lead of smaller resistance per unit length whereby compensation is had for the resistance of said conducting leads irrespective of the distances of said conducting elements from said network.

11. Measuring apparatus including a normally unbalanced electrical bridge network, means to supply electric current to said network, a galvanometer responsive to unbalanced E. M. F.'s in said network and having one terminal connected thereto, a plurality of resistances disposed at different distances from said network, two conducting leads of the same material but of different wire size associated with each of said resistances and extending between opposite terminals thereof and said network, a third conducting lead associated with each of said resistances and adapted to connect one terminal thereof to the other terminal of said galvanometer, and switching means connected to said conducting leads for successively connecting each of said resistances to said bridge network and said galvanometer, said two first mentioned conducting leads being so connected to said network that all of the current to each of said resistances flows through the larger conducting lead whereby compensation is had for the resistance of said conducting leads irrespective of the distances of said resistances from said network.

12. Measuring apparatus including a normally unbalanced electrical bridge network, means to supply electric current to said network, a galvanometer responsive to unbalanced E. M. F.'s in said network and having one terminal connected thereto, a plurality of conducting elements disposed at different distances from said network, two conducting leads associated with each of said conducting elements and respectively adapted to connect one terminal of each of said conducting elements to said network and to the other terminal of said galvanometer, a third conducting lead common to all of said conducting elements and connecting the other terminal of each of said conducting elements to said network, and switching means connected to said conducting leads to successively connect each of said conducting elements to said bridge network and to said galvanometer, said third conducting lead being of lower resistance per unit length than the conducting lead which connects the other end of each of said conducting elements to said network and said conducting leads being so connected to said network that all of the current to each of said conducting elements flows through said third conducting lead whereby compensation is had for the resistance of all of said conducting leads irrespective of the length thereof.

13. Measuring apparatus including a normally unbalanced electrical bridge network having a conducting element in one arm, said conducting element disposed at a distance from said network, means to energize said network, a device connected in said network to indicate the state of unbalance of said network, and three electrical conducting leads at least two of which are of the same material but of different wire size connecting said conducting element to said network and device, said conducting leads being so connected to said network that all of the current to said conducting element flows through the larger of said two conducting leads whereby compensation is had for the impedance of the conducting leads irrespective of the length of the conducting leads.

14. Measuring apparatus including a normally unbalanced electrical bridge network having a variable resistance to be measured in one arm, said resistance disposed at a distance from said network, means to supply electric current to said network, a device to indicate the state of balance of said network, and three electrical conducting leads extending between said resistance and said network, at least two of said conducting leads being of the same material but of different wire size and all of said conducting leads being so connected to said network that all of the current through said resistance flows through the larger of said two conducting leads whereby compensation is had for the resistance of said conducting leads irrespective of the distance of said resistance from said network.

HARRY S. JONES.

CERTIFICATE OF CORRECTION.

Patent No. 2,285,118. June 2, 1942.

HARRY S. JONES.

It is hereby certified that error appears in the printed specification of the above numbered patent requiring correction as follows: Page 4, first column, line 50, claim 1, and line 67, claim 2, after "latter" insert --irrespective of the length of said conducting leads--; and second column, line 19, claim 3, after "lead" insert --irrespective of the length of said conducting leads--; and that the said Letters Patent should be read with this correction therein that the same may conform to the record of the case in the Patent Office.

Signed and sealed this 18th day of August, A. D. 1942.

(Seal)

Henry Van Arsdale,
Acting Commissioner of Patents.